(No Model.)
R. F. LEWIS.
HORSESHOE.
No. 479,137.  Patented July 19, 1892.
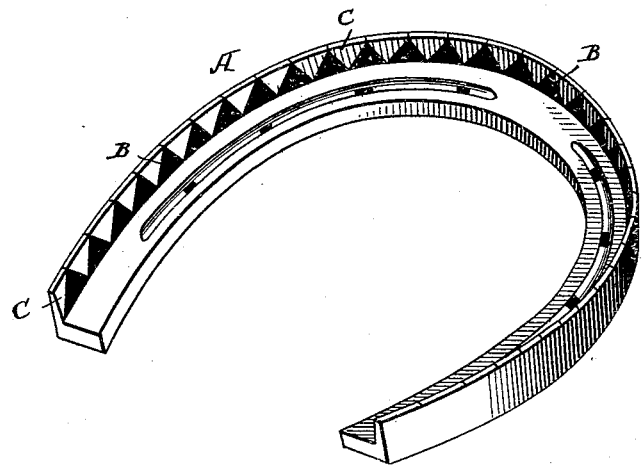
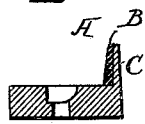
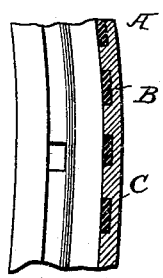
Witnesses
Wm. E. Neff
Jno. G. Hinkel
Inventor
Robert F. Lewis
By J. A. Watson
Attorney

UNITED STATES PATENT OFFICE.

ROBERT F. LEWIS, OF SCRANTON, PENNSYLVANIA.

HORSESHOE.

SPECIFICATION forming part of Letters Patent No. 479,137, dated July 19, 1892.

Application filed January 7, 1891. Serial No. 376,957. (No model.)

*To all whom it may concern:*

Be it known that I, ROBERT F. LEWIS, a citizen of the United States, residing at Scranton, in the county of Lackawanna and State of Pennsylvania, have invented a new and useful Horseshoe, of which the following is so full, clear, and exact a description as will enable others skilled in the art to which my invention appertains to make and use the same, reference being had to the accompanying drawings, in which—

Figure 1 is a perspective view of the shoe embodying my invention. Fig. 2 is a cross-section through the body of the shoe, and Fig. 3 is a partial longitudinal section through the calk.

The invention has for its object to provide a durable shoe, which will secure to the animal the greatest comfort and security by providing a continuous bearing around the hoof and one which is self-sharpening and adapted to take a secure hold at any point.

It consists in making the continuous calk or outer wall of the shoe of two vertical layers of metal of different degrees of hardness, the harder metal being serrated or formed with teeth, whereby the requisite strength is secured, while the unequal wear of the two metals will preserve a comparatively sharp edge, which is more or less serrated, to prevent slipping.

As shown in the drawings, the hard metal is disposed on the inside of the continuous calk A and is serrated or notched to form teeth B, the soft metal C being disposed on the outside of and between the teeth, leaving a smooth interior surface. As the soft metal wears away, the points of the teeth B are exposed and form holding-points, and as the points gradually wear off bearing-edges are formed, which, being thin, enable the animal to secure a good hold upon the roadway.

In the construction shown and described the soft metal will constantly wear away in advance of the harder metal, leaving only the edges of the latter exposed, from which it follows that if the layer of hard metal be of uniform thickness the thickness of the bearing or holding edges will always remain the same until the calk is entirely worn away. This is not the case with a calk of uniform hardness throughout. In such a calk all the wear is on the edge of the bearing-surface and the more it is worn the duller or thicker it becomes, until finally it becomes so thick and dull that it affords the animal no hold whatever.

What I claim, and desire to secure by Letters Patent, is—

A horseshoe provided with a continuous calk or outer wall formed of vertical layers of metal of different degrees of hardness, the harder metal being serrated to form teeth and the softer metal being disposed at the side of and between said teeth, substantially as shown and described.

In testimony whereof I affix my signature in the presence of two witnesses.

ROBERT F. LEWIS.

Witnesses:
WILLIAM H. KENNEDY,
T. KELLOGG.